United States Patent
Leon

(10) Patent No.: US 7,790,993 B2
(45) Date of Patent: Sep. 7, 2010

(54) ANTI-INTRUSION DEVICE PRIMARILY FOR AN ELECTRONIC PAYMENT TERMINAL

(75) Inventor: Jean-Luc Leon, Sonchamp (FR)

(73) Assignee: Thales (FR)

( * ) Notice: Subject to any disclaimer, the term of this patent is extended or adjusted under 35 U.S.C. 154(b) by 1026 days.

(21) Appl. No.: 10/574,707

(22) PCT Filed: Sep. 29, 2004

(86) PCT No.: PCT/EP2004/052352

§ 371 (c)(1),
(2), (4) Date: Apr. 5, 2006

(87) PCT Pub. No.: WO2005/034157

PCT Pub. Date: Apr. 14, 2005

(65) Prior Publication Data

US 2008/0230355 A1    Sep. 25, 2008

(30) Foreign Application Priority Data

Oct. 7, 2003 (FR) .................................. 03 11726

(51) Int. Cl.
*H01H 9/20* (2006.01)
*H01H 9/22* (2006.01)
(52) U.S. Cl. .................................. 200/50.02
(58) Field of Classification Search .............. 200/50.01, 200/50.02
See application file for complete search history.

(56) References Cited

U.S. PATENT DOCUMENTS

| 6,921,988 B2 * | 7/2005 | Moree | 307/119 |
| 7,259,341 B2 * | 8/2007 | Quinque et al. | 200/511 |
| 7,511,235 B2 * | 3/2009 | Osada | 200/6 A |

FOREIGN PATENT DOCUMENTS

| EP | 0 411 185 A | 2/1991 |
| FR | 2 806 507 A | 9/2001 |
| FR | 2 815 733 A | 4/2002 |

* cited by examiner

*Primary Examiner*—Michael A Friedhofer
*Assistant Examiner*—Lheiren Mae A Caroc
(74) *Attorney, Agent, or Firm*—Lowe Hauptman Ham & Berner, LLP

(57) ABSTRACT

The present invention relates to an anti-intrusion device for the protection of housings. It applies in particular to the protection of a housing of an electronic payment terminal or of a housing for entering a confidential code (also known as a "PIN-pad").

The anti-intrusion device according to the invention makes it possible to detect any attempts to open a housing. It comprises at least one spring (3), the spring being arranged in such a way as to be under pressure and to act electrically on an electronic circuit (2) when the housing is closed, and to no longer act on the electronic circuit when the housing is open.

16 Claims, 6 Drawing Sheets ated device for the protection of housings. It applies in particular to the protection of a housing of an electronic payment terminal or of a housing for entering a confidential code (also known as a "PIN-pad").

An electronic payment terminal comprises a housing in which are provided in particular an information screen, a memory card reader, a keypad on which a customer can enter a confidential code, and processing means associated with the reader and with the keypad so as to perform the verifications and the transaction. The processing means comprise electronic circuits making it possible to carry out sensitive functions, such as the verification the validity of the code entered by the customer.

Certain terminals may be modified in a fraudulent manner so as to disrupt their operation, and for example record the confidential codes entered by the customers or debit an amount greater than that displayed by the information screen. In order to avoid these frauds, provision is made for devices for protecting against intrusion into a housing. These devices make it possible to detect any opening of the housing, the processing means being deactivated in case of opening. For example, French patent application No. 00 03465, filed on Mar. 17, 2000 and published under the number FR 2 806 507, describes an elastomer membrane in which at least one button for detecting opening is molded.

The French patent application filed on Oct. 20, 2000 and published under the number FR 2 815 733, describes a security device for a keypad.

The invention aims to afford an alternative technical solution to this problem, this solution being economical and easy to implement. The invention has moreover the advantage of being robust and of exhibiting lasting reliability over time by virtue of the use of a spring. The invention also has the advantage that it avoids the detection of untimely openings, especially when the housing is subjected to impacts or vibrations.

For this purpose, the anti-intrusion device according to the invention comprises at least one spring, the spring being arranged in such a way as to be under pressure and act electrically on an electronic circuit when the housing is closed, and to no longer act on the electronic circuit when the housing is open.

Figure 2:
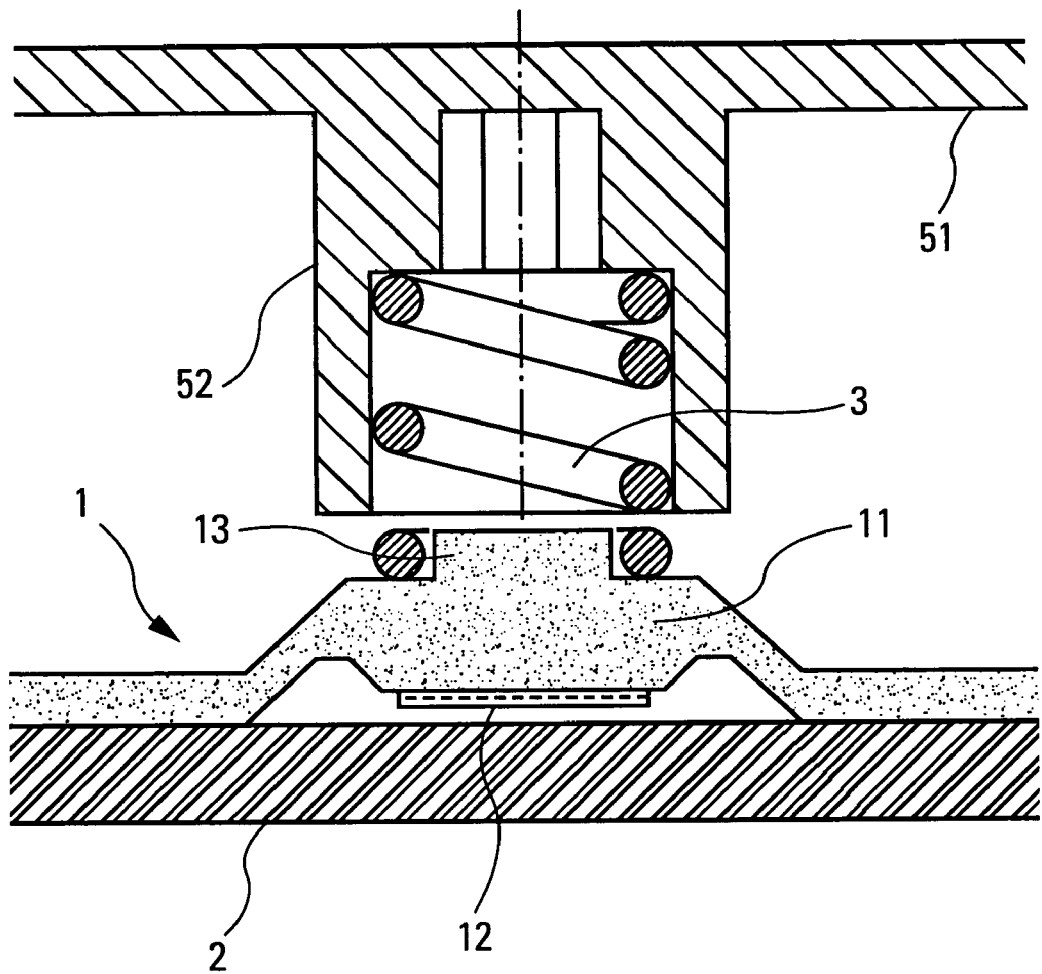
Figure 3:
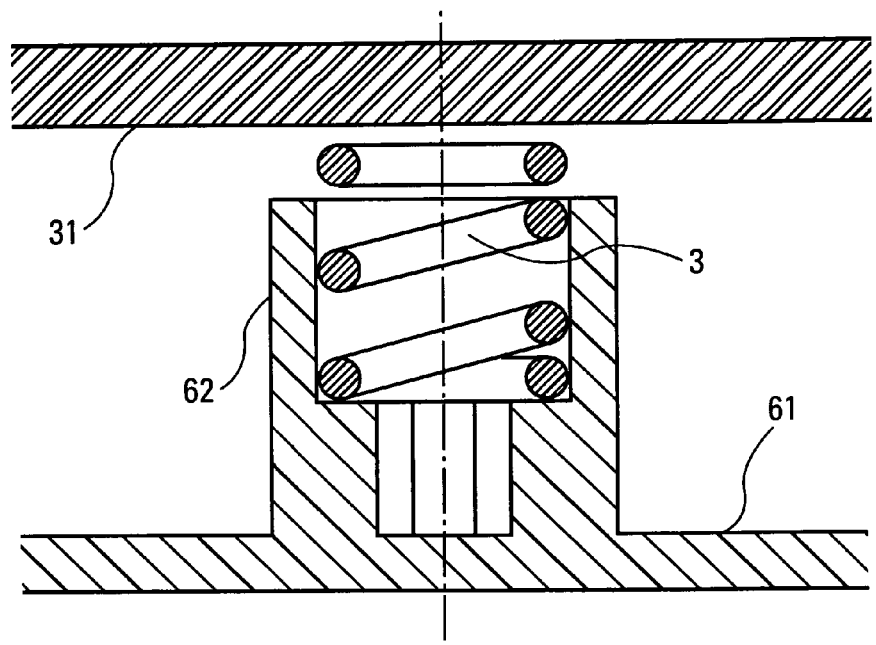
Figure 4:
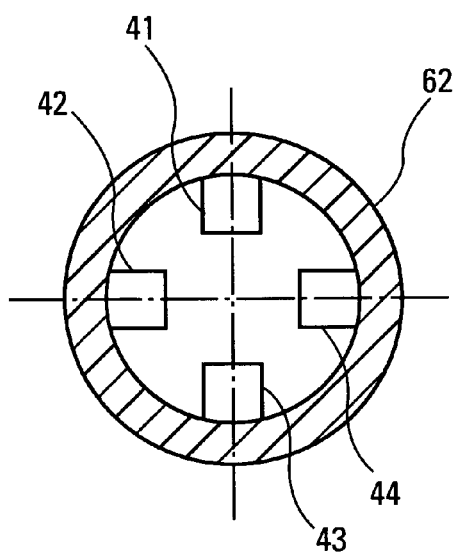
Figure 5:
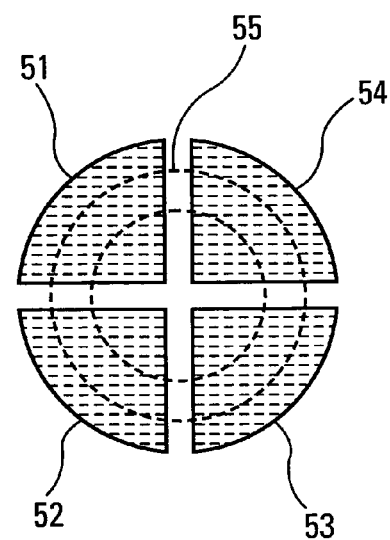
Figure 6:
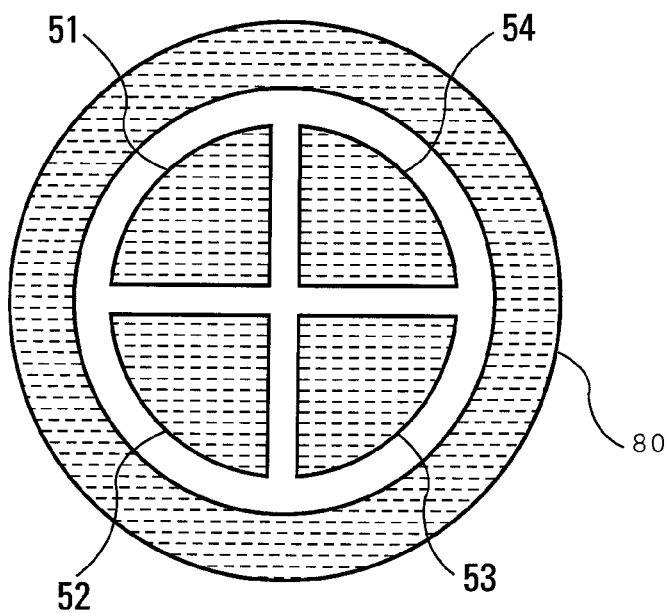
Figure 7:
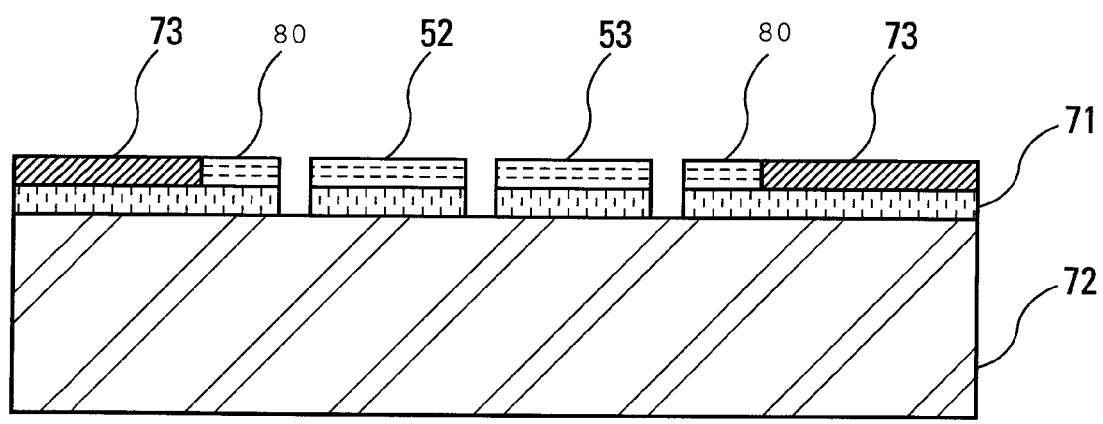

Other characteristics and advantages of the invention will become apparent on reading the detailed description which follows given by way of nonlimiting illustration and offered with reference to the appended figures, which represent:

FIGS. 1a to 1d, elements of an electronic payment terminal in perspective views;

FIG. 2, the detail of an advantageous embodiment of the invention in a sectional view;

FIG. 3, the detail of another embodiment of the invention in a sectional view;

FIG. 4, an exemplary guidance device according to an advantageous embodiment of the invention;

FIG. 5, an example of electrical contacts of an electronic circuit on which a spring acts according to the invention;

FIGS. 6 and 7, an exemplary advantageous embodiment in which the circuit on which the anti-intrusion device acts comprises at least one conducting zone at a determined potential, placed around the location where the spring acts on the circuit.

Reference is now made to FIGS. 1a to 1d in which is represented by way of example an electronic payment terminal of portable type (wire-based or wireless).

Figure 1A:
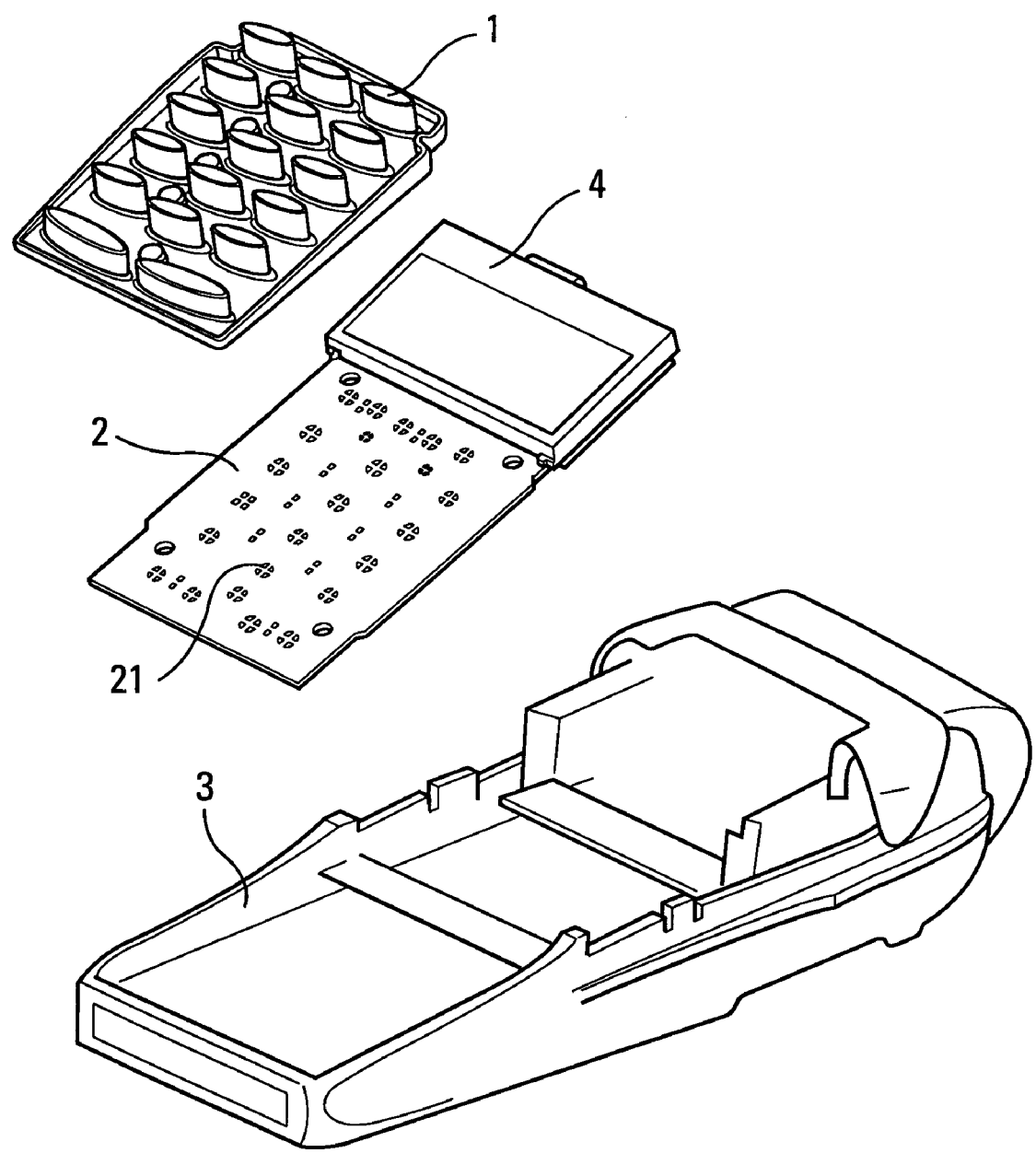

We refer to FIG. 1a. The terminal comprises a chassis 3 receiving constituent elements of the terminal, such as a printer, a memory card reader. According to a variant embodiment not represented, the chassis is dispensed with and the elements of the terminal are mounted directly on the internal surfaces of a housing.

The terminal furthermore comprises a keypad. A keypad membrane 1, preferably made of elastomer, can form the keys of the keypad. The keypad membrane 1 may be clipped onto an electronic circuit 2 making it possible in particular to detect the depressing of the keys of the keypad. The electronic circuit 2 is preferably a multi-layer circuit. That surface of the circuit 2 which is intended to be in contact with the keypad membrane 1 comprises electrical contacts 21, forming ends of conducting tracks extending in internal layers of the circuit.

The terminal furthermore comprises a display screen 4, the screen being mountable directly on the electronic circuit 2.

Figure 1B:
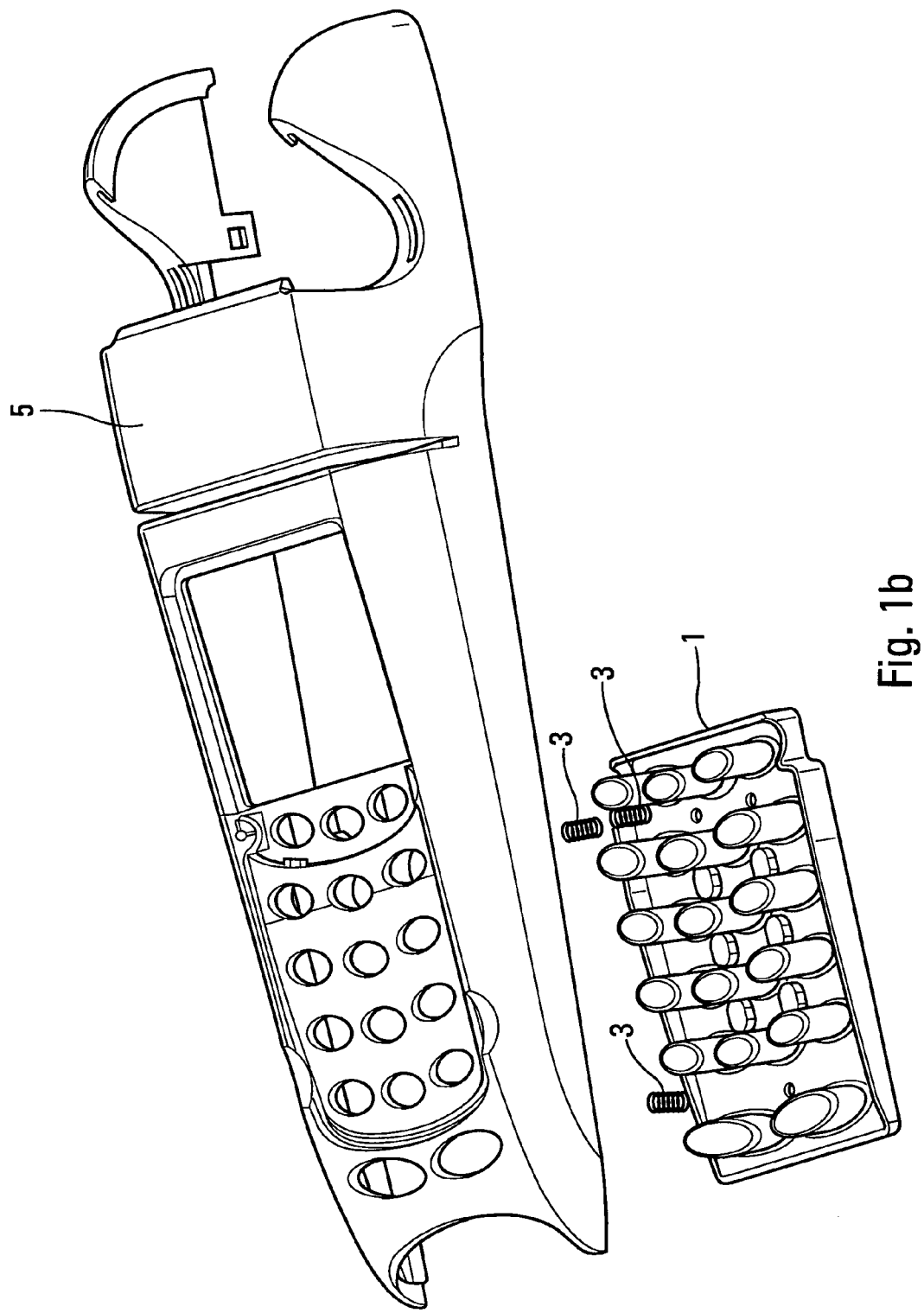
Figure 1C:
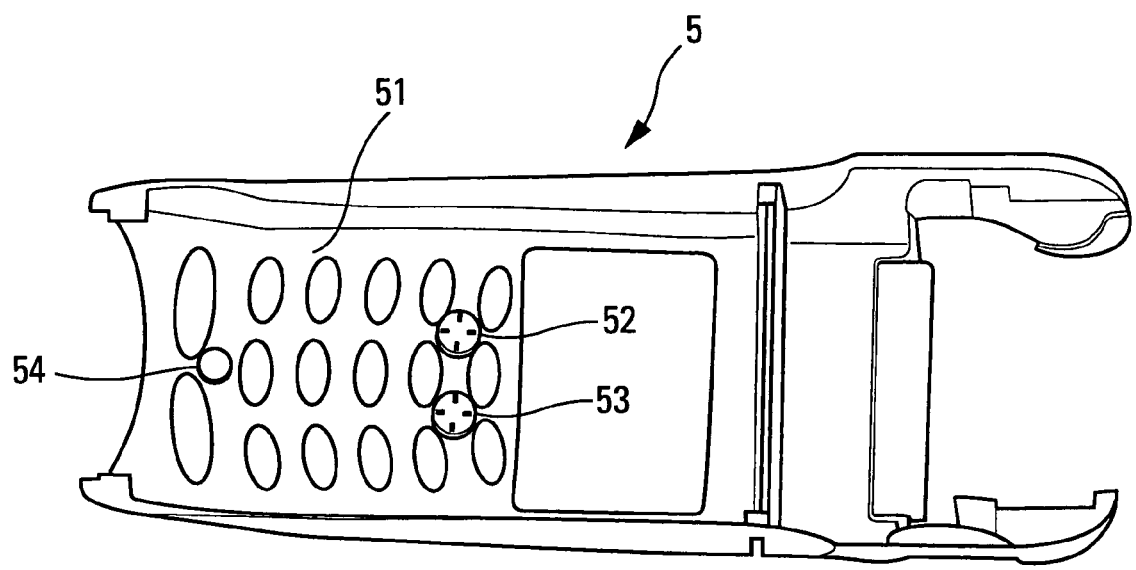

We refer to FIGS. 1b and 1c. The terminal comprises a housing that can be formed essentially of two pieces, an upper cowl 5 and a lower cowl 6 (see FIG. 1d). The upper cowl comprises openings allowing access to the keys of the keypad and making it possible to see the display screen. Anti-intrusion devices according to the invention may be provided at the level of the upper cowl 5. In the example represented, three anti-intrusion devices 52, 53, 54 are provided on the internal surface 51 of the upper cowl 5. According to an advantageous embodiment, each anti-intrusion device comprises a spring 3 arranged so as to act electrically on the electronic circuit 2 by way of the elastomer membrane 2.

Figure 1D:
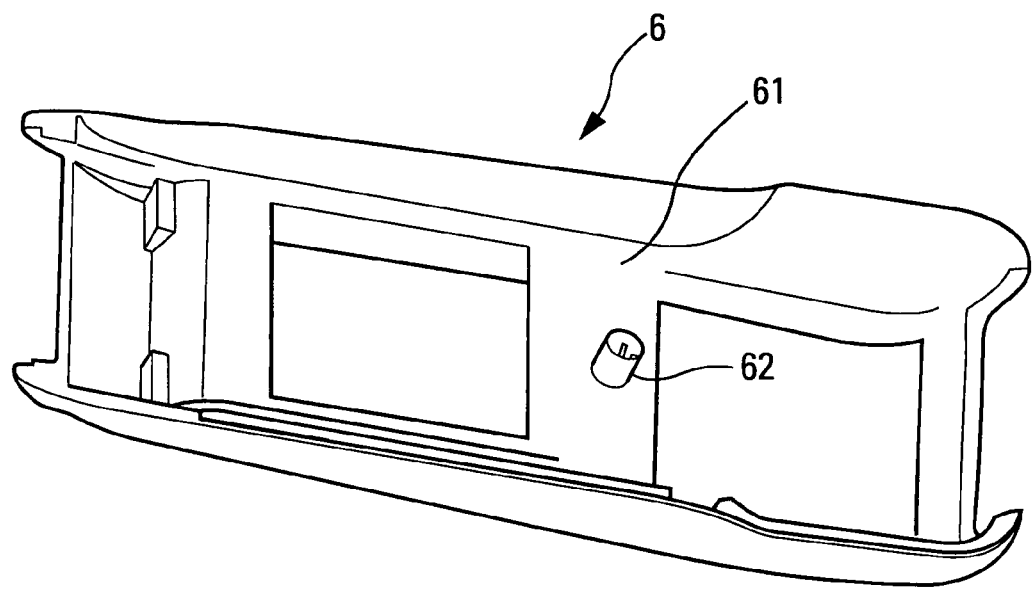

We refer to FIG. 1d. An anti-intrusion device according to the invention may furthermore be provided at the level of the lower cowl 6, the lower cowl being that part of the housing on which the terminal rests during normal operation. In the example represented, an anti-intrusion device 62 is provided on the internal surface 61 of the lower cowl. This device makes it possible to detect attempts to open the housing via the lower cowl, which generally comprises a hatch for access to a battery.

Reference is now made to FIG. 2 in which is represented in greater detail one of the three anti-intrusion devices provided on the interior surface 51 of the upper cowl. The anti-intrusion device comprises at least one spring 3, arranged in such a way as to be under pressure and act electrically on the electronic circuit 2 when the housing is closed, and to no longer act on the electronic circuit when the housing is open.

An end of the spring 3 is preferably fixed to an internal surface of the housing. In this way, the mounting of a terminal is simplified. Moreover, the spring being integral with the housing, any opening of the housing strains the spring directly.

The other end of the spring is intended to be in contact with the keypad membrane 1, in which is molded at least one button 11. The membrane is arranged so that the spring presses on the button when the housing is closed, and so that the spring leaves the button unstressed when the housing is open. The button is arranged in such a way as to act on the electronic circuit when it is placed under pressure by the spring, and to no longer act on the electronic circuit when it is left unstressed.

The manner of operation of the anti-intrusion device is as follows. When the housing is closed, the spring is under pressure. It exerts a pressure on the button 11, this pressure being sufficient to keep the button in a depressed state. When the housing is open, the spring is unstressed. No pressure being exerted on the button 11, the button is in an unstressed state in which it does not act on the electronic circuit, as represented in FIG. 2.

During the housing opening movement, the spring recedes from the membrane, thereby allowing the possibility of elongating. The spring elongates firstly while maintaining contact with the button of the membrane. As the spring elongates, the pressure that it exerts on the button 11 decreases progressively. At a given pressure threshold, the pressure exerted on the button is not sufficient to keep the button depressed. The button then passes to an unstressed state in which it no longer acts on the electronic circuit. This transition may then be detected as an intrusion by the electronic circuit.

This advantageous embodiment of the invention thus makes it possible to ensure a reliable transition from the depressed state to the unstressed state of the button during an intrusion, that is to say when opening the housing. Employing the spring avoids false alerts, especially in case of simple impacts.

According to a practical embodiment which is simple to implement, the action of the button on the electronic circuit is effected through an electrical contact between a conducting part 12 of the button and conducting tracks of the circuit. The conducting part 12 may be formed by a conducting surface such as a gold-plated insert or a deposition of carbon.

According to an advantageous embodiment, the button exhibits a shoulder 13 arranged so as to keep the spring in position with respect to the button. This shoulder makes it possible no only to keep the spring in position centered with respect to the button, but also to facilitate mounting.

Of course, the membrane in which an anti-intrusion device button according to the invention is molded is not necessarily a keypad membrane.

We now refer to FIG. 3 in which is represented in greater detail the anti-intrusion device provided on the internal surface 61 of the lower cowl. In this embodiment of the invention, the spring 3 of the anti-intrusion device acts directly on an electronic circuit 31, and not by way of a membrane. The action of the spring on the electronic circuit is effected through an electrical contact between a conducting part of the spring and conducting tracks of the circuit (see FIG. 5).

According to an advantageous embodiment of the invention, the anti-intrusion device furthermore comprises a guidance device 62 for guiding the spring. The spring is placed in the guidance device. The guidance device 62 is arranged so as to guide the spring along the longitudinal axis of the spring. The guidance device makes it possible to render the anti-intrusion device more reliable, by guiding the travel of the spring. It furthermore makes it possible to keep the spring in place.

According to a practical embodiment, the guidance device can be molded directly in the internal surface of the housing as represented in FIG. 2 or 3. Of course, the guidance device can also be formed by a piece which is independent of the housing, this piece being fixed to an internal surface of the housing. This makes it possible for example to provide a modular anti-intrusion device, in which a spring is already fixed in a guidance device, the guidance device being formed by an independent piece.

We refer to FIG. 4. According to an advantageous embodiment, the guidance device 62 exhibits a substantially cylindrical recess, in which recess the spring is intended to be placed. The guidance device thus makes it possible to protect the spring of the anti-intrusion device. Moreover, in the advantageous embodiment described in conjunction with FIG. 2, the guidance device makes it possible to protect the button 11 from the membrane by partially concealing the former. This prevents the possibility of a fraudster having direct access thereto.

According to an advantageous embodiment, the guidance device comprises a shim for limiting the travel of the spring. This makes it possible to provide springs of small sizes, which are more sensitive to the housing opening movements. The shim can be formed by ribs 41, 42, 43, 44 of material that are provided inside the cylindrical recess.

We refer to FIG. 5 in which is represented an example of electrical contacts of an electronic circuit on which a spring according to the invention acts in the embodiment described in conjunction with FIG. 3. The electrical contacts are at least two in number. They may be four in number 51, 52, 53, 54. When the spring is in contact with the electronic circuit, its last turn 55 electrically links the various contacts or at least two of them. It will be noted that the same form of electrical contacts can be used in the embodiment described in conjunction with FIG. 2, the conducting part under the button replacing the role of the spring.

We refer to FIGS. 6 and 7 in which is represented an advantageous exemplary embodiment. A conducting zone 80 may be added around the electrical contacts 51, 52, 53, 54 of the circuit. The conducting zone is linked to a determined potential, such a ground of the electronic circuit. The conducting zone may be formed by a ring-shaped track surrounding the contacts 51, 52, 53, 54. Thus, if anyone attempts to inject a conducting product at the level of the electrical contacts 51, 52, 53, 54 (with the aid of a syringe for example), an electrical contact will be established not only between the contacts 51, 52, 53, 54, but also with the conducting zone 80. The contacts 51, 52, 53, 54 will then be placed at the determined potential, and this will be detectable as an attempted intrusion.

FIG. 7 presents a cross section of an exemplary embodiment of such a circuit. The circuit can comprise a layer of insulating resin forming a support 72, carrying a layer of copper etched by conventional techniques. The copper layer comprises for example a ground plane 71, comprising recesses at the level of the locations of the contacts 51, 52, 53, 54, and almost wholly covering the circuit. The ground plane 71 may for its part be almost wholly covered with an insulating varnish 73. The contacts 51, 52, 53, 54 may be formed by depositions of gold above the copper layer. The conducting zone 80 may be formed by a ring-shaped deposition of gold, above the copper ground plane, in a zone not covered with varnish.

The invention claimed is:

1. An anti-intrusion device for detecting possible attempts to open a housing, comprising at least one spring, the spring being arranged in such a way as to be under pressure and act electrically on an electronic circuit when the housing is closed, and to no longer act on the electronic circuit when the housing is open;

wherein the spring is placed in a guidance device arranged so as to guide the spring along the longitudinal axis of said spring;

wherein the action of the spring on the electronic circuit is effected through an electrical contact between a conducting part of the spring and conducting tracks of the circuit;

wherein an end of the spring is in contact with the electronic circuit, and is electrically linked to at least two of the various conducting tracks; and wherein a conducting zone is disposed around the conducting tracks, the conducting zone being linked to a determined potential.

2. The device as claimed in claim 1, wherein an end of the spring is fixed to an internal surface of the housing.

3. The device as claimed in claim 1, wherein the guidance device exhibits a substantially cylindrical recess, in which recess the spring is intended to be placed.

4. The device as claimed in claim 1 comprising an elastomer membrane in which is molded at least one button, the membrane being arranged so that the spring presses on the button when the housing is closed, and so that the spring leaves the button unstressed when the housing is open, the button being arranged in such a way as to act on the electronic circuit when it is placed under pressure by the spring, and to no longer act on the electronic circuit when it is left unstressed.

5. The device as claimed in claim 4, wherein the action of the button on the electronic circuit is effected through an electrical contact between a conducting part of the button and conducting tracks of the circuit.

6. The device as claimed in claim 5, wherein when the conducting part of the button is in contact with the electronic circuit, the conducting part of said button is electrically linked to the various conducting tracks or at least two of them.

7. The device as claimed in claim 6, wherein a conducting zone is disposed around the conducting tracks, the conducting zone being linked to a determined potential.

8. The device as claimed in claim 4, wherein the button exhibits a shoulder arranged so as to keep the spring in position with respect to the button.

9. The device as claimed in claim 4, wherein the elastomer membrane also comprises keypad key buttons.

10. The device as claimed in claim 1, wherein the spring is placed in a guidance device arranged so as to guide the spring along the longitudinal axis of said spring, the said device comprising an elastomer membrane in which is molded at least one button, the membrane being arranged so that the spring presses on the button when the housing is closed, and so that the spring leaves the button unstressed when the housing is open, the button being arranged in such a way as to act on the electronic circuit when it is placed under pressure by the spring, and to no longer act on the electronic circuit when it is left unstressed.

11. The device as claimed in claim 10, wherein the action of the button on the electronic circuit is effected through an electrical contact between a conducting part of the button and conducting tracks of the circuit.

12. The device as claimed in claim 11, wherein when the conducting part of the button is in contact with the electronic circuit, the conducting part of said button is electrically linked to the various conducting tracks or at least two of them.

13. The device as claimed in claim 12, wherein a conducting zone is disposed around the conducting tracks, the conducting zone being linked to a determined potential.

14. The device as claimed in claim 10, wherein the button exhibits a shoulder arranged so as to keep the spring in position with respect to the button.

15. The device as claimed in claim 10, wherein the elastomer membrane also comprises keypad key buttons.

16. The device as claimed in claim 1, wherein the housing is a housing of an electronic payment terminal or a housing for entering a confidential code.

* * * * *